US009965293B2

(12) United States Patent
Desimone et al.

(10) Patent No.: US 9,965,293 B2
(45) Date of Patent: May 8, 2018

(54) TECHNIQUES FOR ADAPTIVE INTERFACE SUPPORT

(71) Applicant: INTEL CORPORATION, Santa Clara, CA (US)

(72) Inventors: Nathaniel L. Desimone, Portland, OR (US); Robert E. Gough, Sherwood, OR (US); Sean C. Dardis, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

(21) Appl. No.: 15/394,922

(22) Filed: Dec. 30, 2016

(65) Prior Publication Data

US 2017/0109174 A1    Apr. 20, 2017

Related U.S. Application Data

(63) Continuation of application No. 14/229,870, filed on Mar. 29, 2014, now Pat. No. 9,552,316.

(51) Int. Cl.
    *G06F 9/44*     (2006.01)
    *G06F 13/38*    (2006.01)
    *G06F 13/42*    (2006.01)

(52) U.S. Cl.
    CPC .......... *G06F 9/4411* (2013.01); *G06F 9/4406* (2013.01); *G06F 13/385* (2013.01); *G06F 13/4282* (2013.01)

(58) Field of Classification Search
    CPC .... G06F 13/382; G06F 13/385; G06F 13/387; G06F 2213/0026
    See application file for complete search history.

(56) References Cited

U.S. PATENT DOCUMENTS

| | | | | |
|---|---|---|---|---|
| 6,895,447 | B2 * | 5/2005 | Brewer | G06F 13/385 710/11 |
| 7,519,751 | B2 * | 4/2009 | Perroni | G06F 13/42 365/189.011 |
| 7,734,839 | B1 * | 6/2010 | Sivertsen | G06F 13/387 709/230 |
| 8,886,864 | B1 * | 11/2014 | Sung | G06F 1/00 710/300 |
| 9,552,316 | B2 * | 1/2017 | Desimone | G06F 9/4411 |
| 2008/0235411 | A1 * | 9/2008 | Zhang | G06F 13/4291 710/28 |
| 2009/0006709 | A1 * | 1/2009 | Zhao | G06F 13/409 710/315 |
| 2013/0294023 | A1 * | 11/2013 | Gay | G06F 1/187 361/679.31 |
| 2014/0006670 | A1 * | 1/2014 | Wagh | G06F 13/4027 710/305 |

(Continued)

*Primary Examiner* — Glenn A Auve

(57) ABSTRACT

Techniques for adaptive interface support are described. In one embodiment, for example, an apparatus may comprise logic, at least a portion of which is in hardware, the logic to execute a basic input/output system (BIOS), determine a respective impedance state for each of one or more pins in an M.2 physical interface, determine an interface type for a peripheral device coupled with the M.2 physical interface based on the impedance states for the one or more pins, and control an operational state of the peripheral device during execution of the BIOS, based on the interface type for the peripheral device. Other embodiments are described and claimed.

22 Claims, 10 Drawing Sheets

(56) References Cited

U.S. PATENT DOCUMENTS

| | | | |
|---|---|---|---|
| 2014/0006729 A1* | 1/2014 | Cox | G06F 3/0604 |
| | | | 711/154 |
| 2014/0047287 A1* | 2/2014 | Lee | G11C 29/10 |
| | | | 714/719 |
| 2014/0122767 A1* | 5/2014 | Hershko | G06F 13/405 |
| | | | 710/313 |

* cited by examiner

US 9,965,293 B2

TECHNIQUES FOR ADAPTIVE INTERFACE SUPPORT

CROSS-REFERENCE TO RELATED APPLICATION

This application is a continuation of, claims the benefit of, and claims priority to U.S. patent application Ser. No. 14/229,870, filed Mar. 29, 2014, the subject matter of which is incorporated herein by reference in its entirety.

TECHNICAL FIELD

Embodiments described herein generally relate to computing device architectures and interfaces.

BACKGROUND

Corresponding to the ongoing proliferation of computing devices of ever-decreasing thicknesses and weights have been various efforts to develop device interface specifications featuring reduced form-factors. M.2, formerly known as the Next Generation Form Factor (NGFF), is an example of such a specification. M.2 defines various physical interface configurations via which M.2-configured peripheral devices such as wireless adapters and solid-state drives may connect to interface buses of host devices. Some such configurations provide physical connections to multiple interface buses at the same time. In various cases, an M.2-configured peripheral device that physically connects to multiple host device interface buses via an M.2 physical interface may only actually use one of those interface buses. Under some such circumstances, it may be desirable that techniques for adaptive interface support be implemented at a host device in order to properly enable functionality of an M.2-configured peripheral device based on the interface bus that it actually uses.

DETAILED DESCRIPTION

Various embodiments may be generally directed to techniques for adaptive interface support. In one embodiment, for example, an apparatus may comprise logic, at least a portion of which is in hardware, the logic to execute a basic input/output system (BIOS), determine a respective impedance state for each of one or more pins in an M.2 physical interface, determine an interface type for a peripheral device coupled with the M.2 physical interface based on the impedance states for the one or more pins, and control an operational state of the peripheral device during execution of the BIOS, based on the interface type for the peripheral device. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
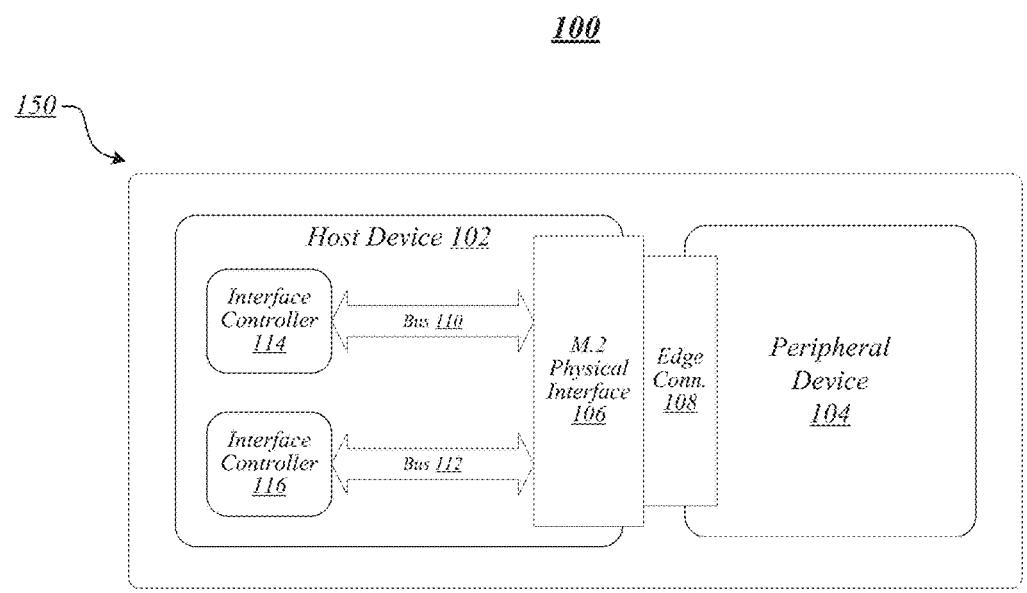
FIG. 1 illustrates one embodiment of an operating environment.

FIG. 1 illustrates an example of an operating environment 100 such as may be representative of various embodiments. In operating environment 100, a host device 102 interfaces with a peripheral device 104. In some embodiments, host device 102 may comprise a motherboard or other type of printed circuit board (PCB). In various embodiments, peripheral device 104 may comprise an M.2-configured peripheral, such as a solid-state drive or wireless communications adapter. In some embodiments, host device 102 and peripheral device 104 may both be comprised within a same apparatus 150. In various such embodiments, apparatus 150 may comprise a computing device such as a tablet, notebook, laptop, or desktop computer, host device 102 may comprise a motherboard of that computing device, and peripheral device 104 may comprise a peripheral contained within that computing device is physically coupled to the motherboard. The embodiments are not limited in this context.

In some embodiments, host device 102 may comprise an M.2 physical interface 106. M.2 physical interface 106 may comprise a socket configured to accept a physical M.2 connection. In various embodiments, M.2 physical interface 106 may be "keyed" or otherwise configured to accept a particular type of physical M.2 connection. In some embodiments, peripheral device 104 may comprise an edge connector 108. In various embodiments, edge connector 108 may physically couple with M.2 physical interface 106 to provide a connection between host device 102 and peripheral device 104. In some embodiments, edge connector 108 may be keyed to match a keying of M.2 physical interface 106. For example, in various embodiments, M.2 physical interface 106 may be physically configured for an M.2 key ID "E" connection, and edge connector 108 may be keyed according to M.2 key ID E. The embodiments are not limited to this example.

In some embodiments, by coupling with host device 102 via M.2 physical interface 106 and edge connector 108, peripheral device 104 may connect to multiple buses. In various such embodiments, each of the multiple buses may be controlled by a different interface controller. For example, as shown in FIG. 1, coupling with host device 102 may connect peripheral device 104 to a bus 110 and a bus 112. Bus 110 is controlled by interface controller 114, while bus 112 is controlled by interface controller 116. In some embodiments, each of the multiple buses may be associated with a different logical interface and/or bus standard. For example, in various embodiments, bus 110 may comprise a Peripheral Component Interconnect Express (PCIe) bus, interface controller 114 may comprise a PCIe controller, bus 112 may comprise a Secure Digital Input/Output (SDIO)

bus, and interface controller 116 may comprise an SDIO controller. The embodiments are not limited to this example.

Figure 2:
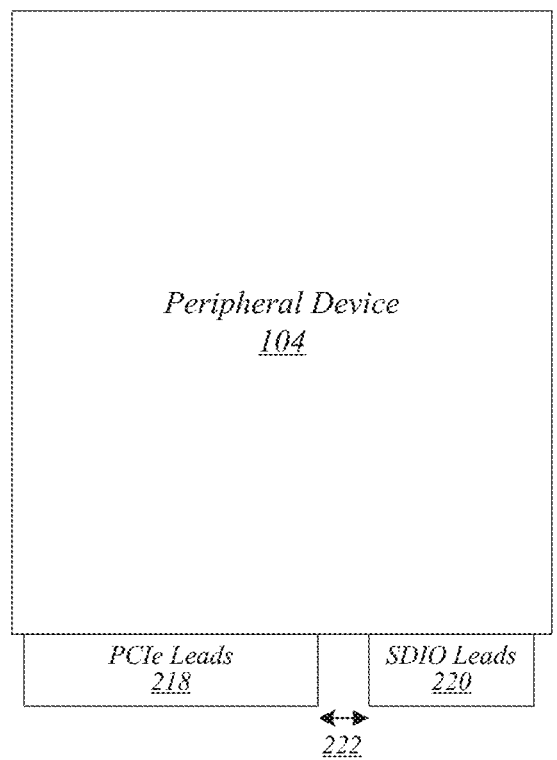
FIG. 2 illustrates one embodiment of a first device.

In some embodiments, the keying of edge connector 108 may correspond to the buses to which it connects. More particularly, in various embodiments, edge connector 108 may comprise a plurality of leads that is arranged in multiple groups, and the size and location of each group may depend on the buses to which edge connector 108 is keyed to connect. FIG. 2 illustrates an example of how the leads of edge connector 108 of FIG. 1 may be arranged in some embodiments. More particularly, FIG. 2 illustrates an example of how those leads may be configured in various embodiments in which edge connector 108 is keyed to connect to a PCIe bus and an SDIO bus.

In FIG. 2, peripheral device 104 comprises PCIe leads 218 and SDIO leads 220. In some embodiments, the positions of these leads may match the positions of corresponding pins in an M.2 physical interface of a host device, such as host device 102 of FIG. 1. More particularly, the lead positions may match the pin positions such that the PCIe leads 218 physically couple with pins connected to a PCIe bus and the SDIO leads 220 physically couple with pins connected to an SDIO bus. In the example of FIG. 2, PCIe leads 218 are separated from SDIO leads 220 by a notch 222. Notch 222 may comprise a gap in a PCB or other substrate upon which PCIe leads 218 and SDIO leads 220 reside. In various embodiments, the position of notch 222 may be a specified parameter of a same keying that specifies the numbers and positions of PCIe leads 218 and SDIO leads 220. For example, in some embodiments, peripheral device 104 may utilize M.2 key ID E, and thus PCIe leads 218, SDIO leads 220, and notch 222 may be arranged according to M.2 key ID E. The embodiments are not limited to this example.

Returning to FIG. 1, it will be appreciated that equipping host device 102 with M.2 physical interface 106 may provide host device 102 with a single socket that can accommodate multiple types of devices and/or multiple bus standards. It is to be understood, however, that a particular peripheral device 104 may not necessarily make use of M.2 physical interface 106 to communicate over multiple buses, even if the edge connector of that peripheral device 104 is configured with leads that couple with multiple buses In other words, a given peripheral device 104 may comprise an edge connector 108 that is keyed to fit M.2 physical interface 106, but may only be designed to use M.2 physical interface 106 to communicate over a single bus. Further, various peripheral devices that perform the same general function may be designed to use different buses. For example, one M.2-configured device may be designed to utilize M.2 physical interface 106 to communicate over a PCIe bus, while another M.2-configured device of a same general type may be designed to utilize M.2 physical interface 106 to communicate over an SDIO bus. In some cases, there may be differences between the respective manners in which host device 102 and/or apparatus 150 must initialize, handle, configure, and/or communicate with such differently-configured devices.

For example, the manner in which host device 102 and/or apparatus 150 may need to initialize a Wi-Fi adapter that is inserted into M.2 physical interface 106 may depend on whether the Wi-Fi adapter is a PCIe device or an SDIO device. A PCIe Wi-Fi adapter may need to be initialized by a basic input/output system (BIOS) of host device 102 and/or apparatus 150, and thus may need to remain in an active state during BIOS execution. On the other hand, an SDIO Wi-Fi adapter may need to be initialized by an operating system of host device 102 and/or apparatus 150, and may need to be placed in a reset state during BIOS execution. In view of such considerations, it may be desirable to implement techniques for adaptive interface support in order to enable concurrent support for various peripheral devices that utilize different respective buses and/or interfaces. According to such techniques, the operations performed to initialize a peripheral device may be selected based on an identification of an interface that the peripheral device uses.

Figure 3:
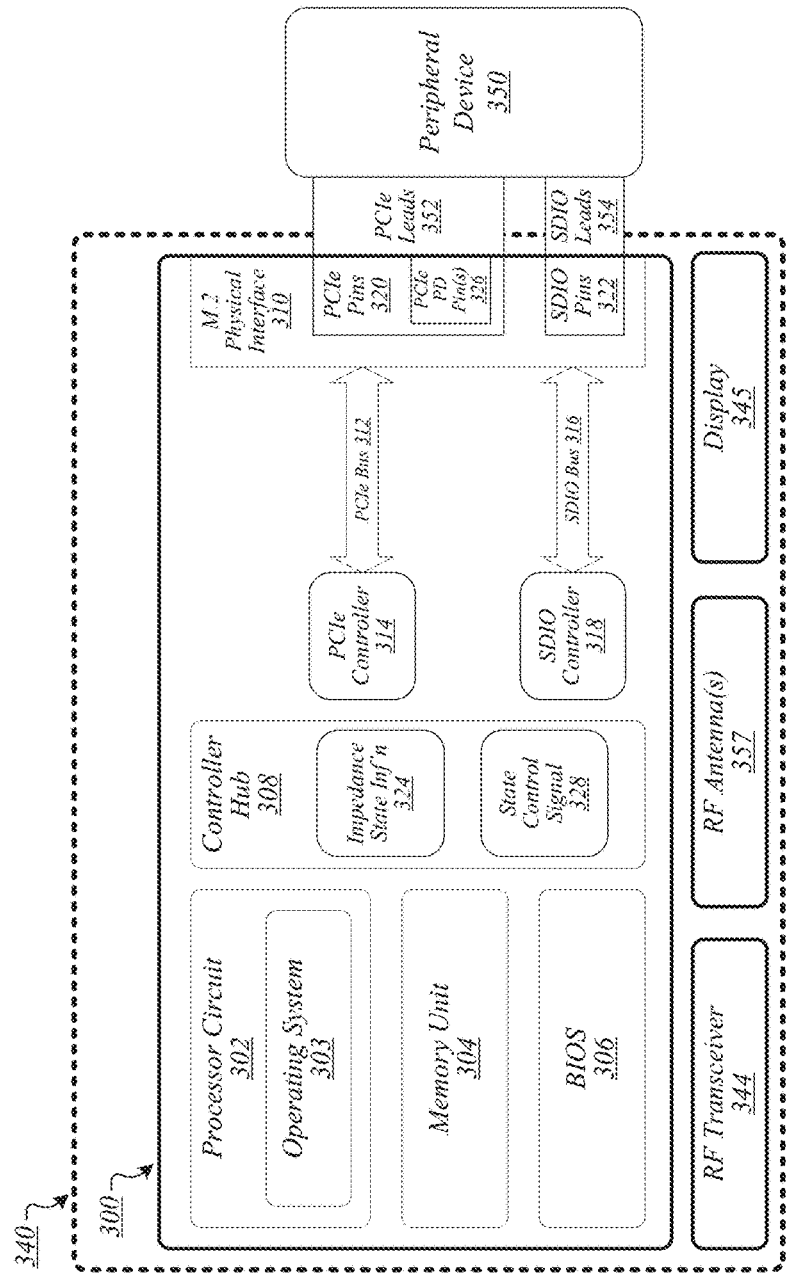
FIG. 3 illustrates one embodiment of an apparatus and one embodiment of a first system.

FIG. 3 illustrates a block diagram of an apparatus 300 such as may implement adaptive interface support techniques in conjunction with performing interface management in various embodiments. As shown in FIG. 3, apparatus 300 comprises multiple elements including a processor circuit 302, a memory unit 304, a BIOS 306, a controller hub 308, and an M.2 physical interface 310. The embodiments, however, are not limited to the type, number, or arrangement of elements shown in this figure. In some embodiments, some or all of the multiple elements of apparatus 300 may reside on a motherboard or other PCB or substrate that is the same as or similar to host device 102 of FIG. 1. It is to be understood that such a motherboard, PCB, or substrate may constitute or be comprised in apparatus 300 even though, in the interest of clarity, such an element is not separately depicted in FIG. 3. The embodiments are not limited in this context.

In various embodiments, apparatus 300 may comprise processor circuit 302. Processor circuit 302 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 302 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 302 may be implemented as a general purpose processor, such as a processor made by Intel® Corporation, Santa Clara, Calif. The embodiments are not limited in this context.

In various embodiments, processor circuit 302 may be operative to execute an operating system 303. Operating system 303 may comprise programming logic operative to utilize and/or control one or more hardware and/or software elements of apparatus 300. For example, operating system 303 may be operative to receive input through one or more input devices, receive information from one or more external devices through one or more communications channels, generate instructions for transmission to one or more elements of apparatus 300 and/or one or more external devices, and/or implement one or more applications. The embodiments are not limited in this context.

In some embodiments, apparatus 300 may comprise or be arranged to communicatively couple with a memory unit 304. Memory unit 304 may be implemented using any machine-readable or computer-readable media capable of storing data, including both volatile and non-volatile memory. For example, memory unit 304 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 304 may be included on the same integrated circuit as processor circuit 302, or alternatively some portion or all of memory unit 304 may be disposed on an integrated circuit or other medium, for example a hard disk drive, that is external to the integrated circuit of processor circuit 302. Although memory unit 304 is comprised within apparatus 300 in FIG. 3, memory unit 304 may be external to apparatus 300 in some embodiments. The embodiments are not limited in this context.

In various embodiments, apparatus 300 may comprise a BIOS 306. BIOS 306 may comprise logic, circuitry, and/or instructions operative to perform one or more operations when apparatus 300 is powered on or reset. For example, following a power-on or a reset of apparatus 300, BIOS 306 may be operative to initialize and/or test one or more components of apparatus 300, and/or to cause processor circuit 302 to commence execution of operating system 303. The embodiments are not limited in this context.

In some embodiments, apparatus 300 may comprise a controller hub 308. Controller hub 308 may comprise logic, circuitry, and/or instructions operative to implement and/or control one or more data paths, interconnects, input/output (I/O) operations, and/or support functions in conjunction with operation of processor circuit 302. In various embodiments, some or all of controller hub 308 may be implemented using one or more chips or integrated circuits. For example, in some embodiments, controller hub 308 may comprise a controller hub chip or chipset. The embodiments are not limited in this context.

In various embodiments, apparatus 300 may comprise an M.2 physical interface 310. M.2 physical interface 106 may comprise a socket configured to accept a physical M.2 connection, and may be the same as or similar to M.2 physical interface 106 of FIG. 1. In some embodiments, M.2 physical interface 310 may be configured to couple with an edge connector of a peripheral device 350 to form a physical M.2 connection with the peripheral device 350. In various embodiments, the peripheral device 350 may comprise a Wi-Fi adapter. The embodiments are not limited in this context.

In some embodiments, apparatus 300 may comprise a PCIe bus 312 and a PCIe controller 314. PCIe bus 312 may comprise one or more data lanes via which logical connection(s) may be established, and data may be exchanged, between apparatus 300 and one or more PCIe devices. PCIe controller 314 may comprise logic, circuitry, and/or instructions operative to manage the establishment of logical connections and the exchange of data over PCIe bus 312. The embodiments are not limited in this context.

In various embodiments, apparatus 300 may comprise an SDIO bus 316 and an SDIO controller 318. SDIO bus 316 may comprise one or more data lanes via which logical connection(s) may be established, and data may be exchanged, between apparatus 300 and one or more SDIO devices. SDIO controller 318 may comprise logic, circuitry, and/or instructions operative to manage the establishment of logical connections and the exchange of data over SDIO bus 316. The embodiments are not limited in this context.

It is worthy of note that although PCIe bus 312, PCIe controller 314, SDIO bus 316, and SDIO controller 318 are depicted as being external to processor circuit 302 and controller hub 308 in the example of FIG. 3, the embodiments are not so limited. For example, in some embodiments, some or all of PCIe controller 314 and/or SDIO controller 318 may be comprised within processor circuit 302 or within controller hub 308. In another example, in various embodiments, some or all of controller hub 308 may be comprised within processor circuit 302. The embodiments are not limited to these examples.

FIG. 3 also illustrates a block diagram of a system 340. System 340 may comprise any of the aforementioned elements of apparatus 300. System 340 may further comprise a radio frequency (RF) transceiver 344. RF transceiver 344 may comprise one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 344 may operate in accordance with one or more applicable standards in any version. The embodiments are not limited in this context.

In some embodiments, system 340 may comprise one or more RF antennas 357. Examples of any particular RF antenna 357 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In various embodiments, RF transceiver 344 may be operative to send and/or receive messages and/or data using one or more RF antennas 357. The embodiments are not limited to these examples.

In some embodiments, system 340 may comprise a display 345. Display 345 may comprise any display device capable of displaying information received from processor circuit 302. Examples for display 345 may include a television, a monitor, a projector, and a computer screen. In one embodiment, for example, display 345 may be implemented by a liquid crystal display (LCD), light emitting diode (LED) or other type of suitable visual interface. Display 345 may comprise, for example, a touch-sensitive display screen ("touchscreen"). In various implementations, display 345 may comprise one or more thin-film transistors (TFT) LCD including embedded transistors. The embodiments, however, are not limited to these examples.

In various embodiments, apparatus 300 and/or system 340 may couple with a peripheral device 350 using M.2 physical interface 310. Peripheral device 350 may comprise a device that is configured to provide apparatus 300 and/or system 340 with particular capabilities and/or functionality. In some embodiments, peripheral device 350 may comprise a Wi-Fi adapter that is configured to provide apparatus 300 and/or system 340 with the ability to wirelessly communicate according to one or more Wi-Fi wireless communications standards. In various embodiments, such Wi-Fi communications standards may include one or more Institute of Electrical and Electronics Engineers (IEEE) 802.11 standards and/or one or more standards developed by the Wi-Fi Alliance (WFA). In some embodiments, wireless communications capabilities provided by a peripheral device 350 comprising a Wi-Fi adapter may enable apparatus 300 and/or system 340 to communicate over a wireless local area network (WLAN). In various embodiments, peripheral device 350 may comprise a PCB. The embodiments are not limited in this context.

In some embodiments, coupling with M.2 physical interface 310 may enable peripheral device 350 to communicatively couple with one or both of PCIe bus 312 and SDIO bus 316. For example, in various embodiments, peripheral device 350 may comprise PCIe leads 352 that communicatively couple to PCIe bus 312 via PCIe pins 320 of M.2 physical interface 310, and may comprise SDIO leads 354 that communicatively couple to SDIO bus 316 via SDIO pins 322 of M.2 physical interface 310. The embodiments are not limited in this context.

In some embodiments, although M.2 physical interface 310 may provide connectivity to both PCIe bus 312 and SDIO bus 316, peripheral device 350 may be configured to actually communicate with apparatus 300 and/or system 340 using only one of these interfaces. For example, in various embodiments, peripheral device 350 may comprise a PCIe device that is configured to communicate with apparatus 300 and/or system 340 over PCIe bus 312. In some other embodiments, peripheral device 350 may comprise an SDIO device that is configured to communicate with apparatus 300 and/or system 340 over SDIO bus 316. The embodiments are not limited in this context.

In some embodiments, when apparatus 300 and/or system 340 is powered on or reset, it may need to initialize peripheral device 350 before it can make use of the capabilities and/or functionality that peripheral device 350 provides. In various embodiments, the nature of the appropriate initialization sequence for peripheral device 350 may differ depending on the interface(s) that peripheral device 350 uses. For example, if peripheral device 350 is a PCIe Wi-Fi adapter, it may be necessary that its initialization be performed by BIOS 306. On the other hand, if peripheral device 350 is an SDIO Wi-Fi adapter, it may be necessary that its initialization be performed by operating system 303. In the latter case, during BIOS execution, the SDIO Wi-Fi adapter may need to be held in a reset state until operating system 303 is running. In the former case, during BIOS execution, the PCIe Wi-Fi adapter may need to be entered into an active state during BIOS execution so that it can be initialized by BIOS 306.

In some embodiments, techniques for adaptive interface support may be utilized to control the state of peripheral device 350 during BIOS execution based on an interface type for peripheral device 350. According to such techniques, following a power-on or a reset of apparatus 300 and/or system 340, the interface type for peripheral device 350 may be determined, and an operational state of peripheral device 350 may be controlled during BIOS execution based on its interface type. The embodiments are not limited in this context.

In various embodiments, following a power-on or a reset of apparatus 300 and/or system 340, BIOS 306 may be initialized and may begin execution. In some such embodiments, apparatus 300 and/or system 340 may comprise logic, circuitry, and/or instructions arranged to automatically initialize and/or commence execution of BIOS 306 following a power-on or a reset. For example, in various embodiments, processor circuit 302 may be configured to automatically execute instructions in memory space of BIOS 306 following a power-on or a reset. The embodiments are not limited in this context.

In some embodiments, BIOS 306 and/or controller hub 308 may be operative to determine that peripheral device 350 is coupled to M.2 physical interface 310. In various embodiments, based on the determination that peripheral device 350 is coupled to M.2 physical interface 310, BIOS 306 may be operative to initiate an interface type determination procedure for determining an interface type for peripheral device 350. In some embodiments, BIOS 306 may be operative to utilize the interface type determination procedure to determine whether peripheral device 350 is a PCIe device or an SDIO device. The embodiments are not limited in this context.

In various embodiments, following the power-on or reset of apparatus 300 and/or system 340, peripheral device 350 may initially be in a reset state. As such, it may not be possible for BIOS 306 to determine the interface type for peripheral device 350 by directly querying peripheral device 350. Rather, in some embodiments, BIOS 306 may be operative to determine the interface type for peripheral device 350 based on information obtained from other sources. For example, in various embodiments, BIOS 306 may be operative to perform this determination based on measurements and/or information obtained from controller hub 308. The embodiments are not limited in this context.

In some embodiments, controller hub 308 may be capable of measuring the impedance states of one or more pins of M.2 physical interface 310. For example, in various embodiments, controller hub 308 may be capable of measuring the impedance states of one or more of PCIe pins 320. In some embodiments, during the interface type determination procedure, BIOS 306 may be operative to instruct controller hub 308 to determine the impedance states of one or more pins of M.2 physical interface 310, and controller hub 308 may be operative to perform the corresponding measurements and provide them to BIOS 306. For example, in various embodiments, controller hub 308 may be operative to measure the impedance states of one or more PCIe pins 320 and to provide the obtained measurements to BIOS 306 as impedance state information 324. In some embodiments, for each of one or more pins of M.2 physical interface 310, impedance state information 324 may comprise information indicating either that the pin is in a high-impedance state or that the pin has an electrical load present. The embodiments are not limited in this context.

In various embodiments, controller hub 308 may be operative to perform impedance measurements on one or more presence detect pins of M.2 physical interface 310. For example, in some embodiments, PCIe pins 320 may comprise one or more PCIe presence detect (PD) pins 326 and controller hub 308 may be operative to perform impedance measurements on those one or more PCIe PD pins 326. The embodiments are not limited in this context.

In various embodiments, BIOS 306 may be operative to determine the interface type for peripheral device 350 based on impedance state information 324. In some embodiments, if impedance state information 324 indicates that one or more measured pins for a particular interface have an electrical load present, BIOS 306 may be operative to identify the corresponding interface as the interface type for peripheral device 350. For example, in various embodiments, if impedance state information 324 indicates that one or more PCIe pins 320 have an electrical load present, BIOS 306 may be operative to determine that peripheral device 350 is a PCIe device. In some embodiments, if impedance state information 324 indicates that all of the measured pins for a particular interface are in a high-impedance state, BIOS 306 may be operative to determine that the corresponding interface is not the interface type for peripheral device 350. For example, in various embodiments, if impedance state information 324 indicates that all measured PCIe pins 320 are in a high-impedance state, BIOS 306 may be operative to determine that peripheral device 350 is an SDIO device. The embodiments are not limited in this context.

In some embodiments, BIOS 306 may be operative to determine the interface type for peripheral device 350 based on impedance state information 324 for one or more presence detect pins of M.2 physical interface 310. For example, in various embodiments, BIOS 306 may receive impedance state information 324 comprising impedance measurements for one or more PCIe PD pins 326. If the impedance state information 324 indicates that all of the one or more PCIe PD pins 326 are in a high-impedance state, BIOS 306 may be operative to determine that peripheral device 350 is an SDIO device. On the other hand, if the impedance state information 324 indicates that an electrical load is present on any of the one or more PCIe PD pins 326, BIOS 306 may be operative to determine that peripheral device 350 is a PCIe device. The embodiments are not limited to this example.

In some embodiments, once BIOS 306 has determined the interface type for peripheral device 350, BIOS 306 and/or controller hub 308 may be operative to control the operational state of peripheral device 350 during BIOS execution based on the interface type for peripheral device 350. In various embodiments, based on the interface type for peripheral device 350, BIOS 306 and/or controller hub 308 may be operative to set and/or maintain peripheral device 350 in a particular operational state for the duration of a particular phase or portion of BIOS execution. For example, in some embodiments, based on the interface type for peripheral device 350, BIOS 306 and/or controller hub 308 may be operative to set and/or maintain peripheral device 350 in either an active state or a reset state until BIOS 306 invokes an operating system boot loader. The embodiments are not limited to this example.

In various embodiments, controller hub 308 may be configured to control the operational state of peripheral device 350 using a state control signal 328 that is sent to peripheral device 350. In some embodiments, state control signal 328 may comprise a PERST#/SDIO_RESET# signal. In various such embodiments, a HIGH value for state control signal 328 may correspond to an active state for peripheral device 350, and a LOW value for state control signal 328 may correspond to a reset state for peripheral device 350. In some other embodiments, a LOW value for state control signal 328 may correspond to an active state for peripheral device 350, and a HIGH value for state control signal 328 may correspond to a reset state for peripheral device 350. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
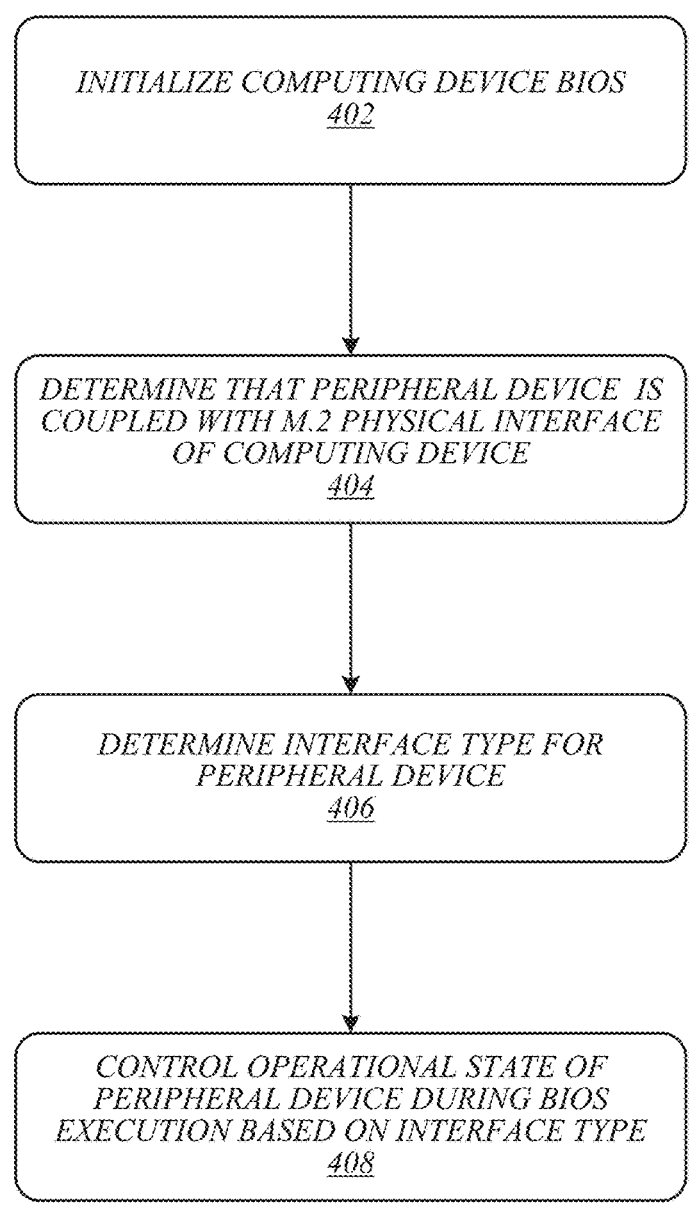
FIG. 4 illustrates one embodiment of a first logic flow.

FIG. 4 illustrates one embodiment of a logic flow 400, which may be representative of the operations executed by one or more embodiments described herein. For example, logic flow 400 may be representative of operations that apparatus 300 and/or system 340 of FIG. 3 may perform in conjunction with adaptive interface support techniques. As shown in logic flow 400, a computing device BIOS may be initialized at 402. For example, following a power-up or reset of apparatus 300 and/or system 340 of FIG. 3, BIOS 306 may be initialized and may begin execution. At 404, it may be determined that a peripheral device is coupled with an M.2 physical interface of the computing device. For example, BIOS 306 and/or controller hub 308 of FIG. 3 may be operative to determine that peripheral device 350 is coupled to M.2 physical interface 310. In various embodiments, the peripheral device may comprise a Wi-Fi adapter.

At 406, an interface type for the peripheral device may be determined. For example, BIOS 306 and/or controller hub 308 of FIG. 3 may be operative to perform an interface type determination procedure to determine an interface type for peripheral device 350. In some embodiments, the interface type for the peripheral device may be determined based on measurements of impedance states of one or more pins of the M.2 physical interface. For example, BIOS 306 and/or controller hub 308 of FIG. 3 may be operative to determine the interface type for peripheral device 350 based on impedance measurements for one or more PCIe PD pins 326. At 408, an operational state of the peripheral device may be controlled during BIOS execution, based on the interface type for the peripheral device. For example, BIOS 306 and/or controller hub 308 may be operative to control the operational state of peripheral device 350 during execution of BIOS 306, based on the interface type for peripheral device 350. The embodiments are not limited to these examples.

Figure 5:
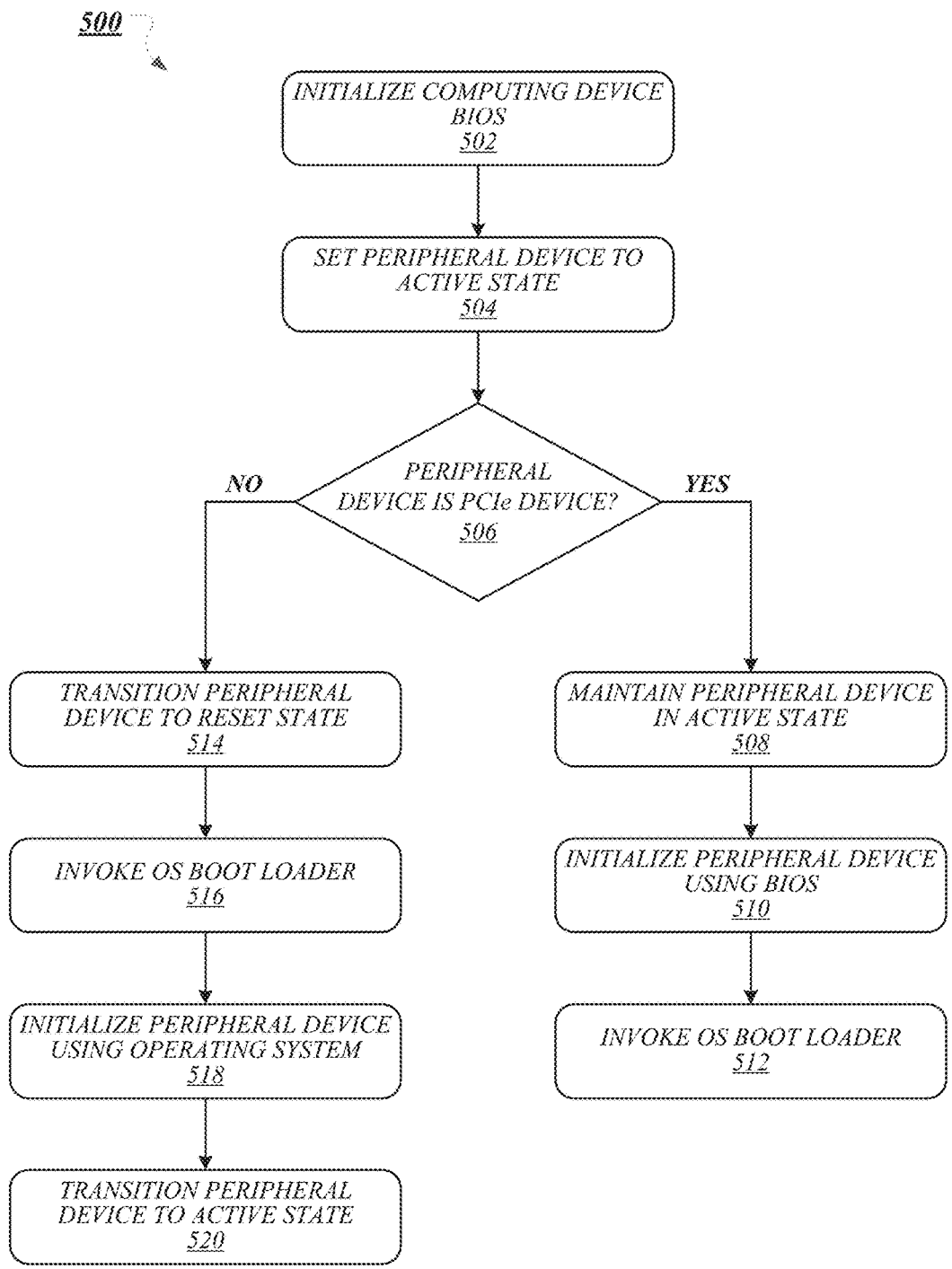
FIG. 5 illustrates one embodiment of a second logic flow.

FIG. 5 illustrates one embodiment of a logic flow 500, which may be representative of the operations executed by one or more embodiments described herein. For example, logic flow 500 may be representative of operations that apparatus 300 and/or system 340 of FIG. 3 may perform in conjunction with determining an interface type for peripheral device 350 and controlling the operational state of peripheral device 350 based on that interface type.

As shown in logic flow 500, a computing device BIOS may be initialized at 502. For example, following a power-up or reset of apparatus 300 and/or system 340 of FIG. 3, BIOS 306 may be initialized and may begin execution. At 504, a peripheral device may be set to an active state. For example, controller hub 308 of FIG. 3 may be operative to set peripheral device 350 to an active state by setting state control signal 328 to a HIGH value. In various embodiments, the peripheral device may comprise a Wi-Fi adapter. At 506, it may be determined whether the peripheral device is a PCIe device. For example, controller hub 308 of FIG. 3 may be operative to measure the impedances on one or more PCIe PD pins 326 of M.2 physical interface 310, and BIOS 306 may be operative to determine whether peripheral device 350 is a PCIe device based on the measured impedance(s).

If it is determined at 506 that the peripheral device is a PCIe device, flow may pass to 508. At 508, the peripheral device may be maintained in the active state. For example, if it is determined that peripheral device 350 of FIG. 3 is a PCIe device, controller hub 308 may be operative to maintain peripheral device 350 in the active state. At 510, the peripheral device may be initialized by the BIOS. For example, if BIOS 306 of FIG. 3 determines that peripheral device 350 is a PCIe device, BIOS 306 may be operative to initialize peripheral device 350. In some embodiments, initializing the peripheral device may comprise enumerating the peripheral device, assigning memory and/or I/O address space to the peripheral device, and/or programming base address registers (BARs) for the peripheral device. From 510, flow may pass to 512, where an operating system boot loader may be invoked. For example, BIOS 306 of FIG. 3 may be operative to invoke a boot loader of operating system 303.

If it is determined at 506 that the peripheral device is not a PCIe device, flow may pass to 514. At 514, the peripheral device may be transitioned to a reset state. For example, controller hub 308 of FIG. 3 may be operative to transition peripheral device 350 to a reset state by setting state control signal 328 to a LOW value. At 516, an operating system boot loader may be invoked. For example, BIOS 306 of FIG. 3 may be operative to invoke a boot loader of operating system 303. From 516, flow may pass to 518, where the peripheral device may be initialized using the operating system. For example, if BIOS 306 of FIG. 3 determines that peripheral device 350 is not a PCIe device, BIOS 306 and/or controller hub 308 may be operative to instruct operating system 303 to initialize peripheral device 350. Flow may then pass to 520, where the peripheral device may be set to the active state. For example, once operating system 303 of FIG. 3 has initialized a peripheral device 350 that comprises an SDIO device, controller hub 308 may be operative to set the peripheral device 350 to the active state by setting state control signal 328 to a HIGH value. The embodiments are not limited to these examples.

It is to be appreciated that the disclosed techniques for adaptive interface support may be applied to other types of interfaces as well as M.2 interfaces. These techniques may be implemented in conjunction with any type of electromechanical or optical connection interface that supports multiple interconnect types. For example, in various embodiments, the disclosed techniques may be used in conjunction with a Mini Card Electromechanical (Mini-CEM) interface. In another example, in some embodiments, the disclosed techniques may be used in conjunction with an ExpressCard interface. Similarly, in some embodiments, one or more interconnect options presented by the utilized interface may differ from the PCIe and SDIO interconnects comprised in an M.2 interface. The embodiments are not limited in this context.

Figure 6:
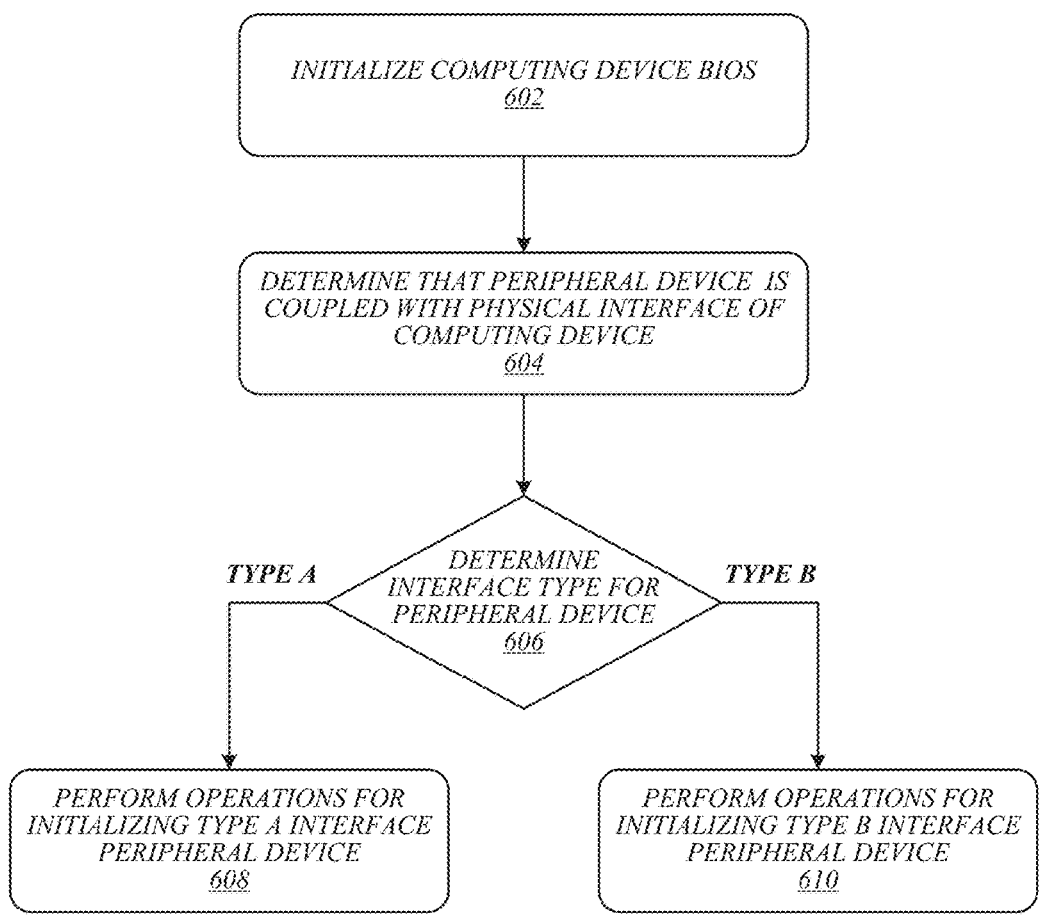
FIG. 6 illustrates one embodiment of a third logic flow.

FIG. 6 illustrates an embodiment of a logic flow 600, which may comprise a more general representation of the operations executed in conjunction with techniques for adaptive interface support in various embodiments, which may include embodiments in which adaptive interface support techniques are used with non-M.2 interfaces. As shown in logic flow 600, a computing device BIOS may be initialized at 602. For example, following a power-up or reset of apparatus 300 and/or system 340 of FIG. 3, BIOS 306 may be initialized and may begin execution. At 604, it may be determined that a peripheral device is coupled with a physical interface of the computing device. For example, BIOS 306 and/or controller hub 308 of FIG. 3 may be operative to determine that peripheral device 350 is coupled to a physical interface of apparatus 300 and/or system 340.

At 606, an interface type for the peripheral device may be determined. In various embodiments, the interface type for the peripheral device may be determined by measuring the impedance states of one or more pins of the physical interface. For example, BIOS 306 and/or controller hub 308 of FIG. 3 may be operative to determine the interface type for peripheral device 350 based on impedance measurements for one or pins of a physical interface. If it is determined at 606 that the peripheral device uses an interface type A, flow may pass to 608, where one or more operations for initializing a type A interface peripheral device may be performed. If it is determined at 606 that the peripheral device uses an interface type B, flow may pass to 610, where one or more operations for initializing a type B interface peripheral device may be performed. For example, BIOS 306 and/or controller hub 308 of FIG. 3 may be operative to perform one or more operations for initializing a type A interface peripheral device or type B interface peripheral device, based on a determination of an interface type used by a peripheral device. The embodiments are not limited to these examples.

Figure 7:
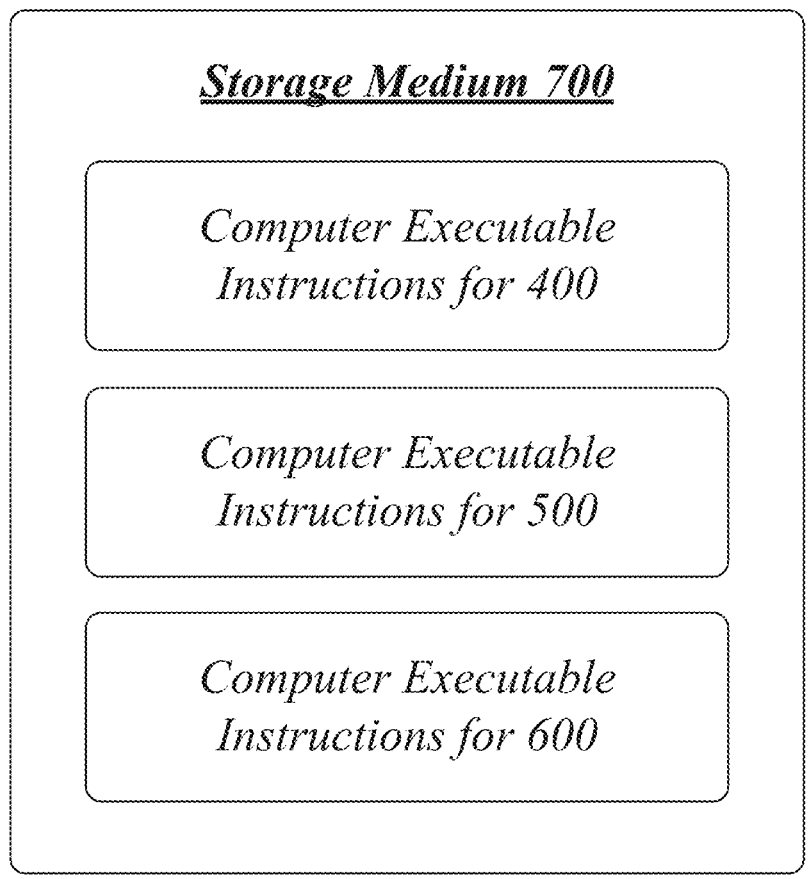
FIG. 7 illustrates one embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement logic flow 400 of FIG. 4, logic flow 500 of FIG. 5, and/or logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or rewriteable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
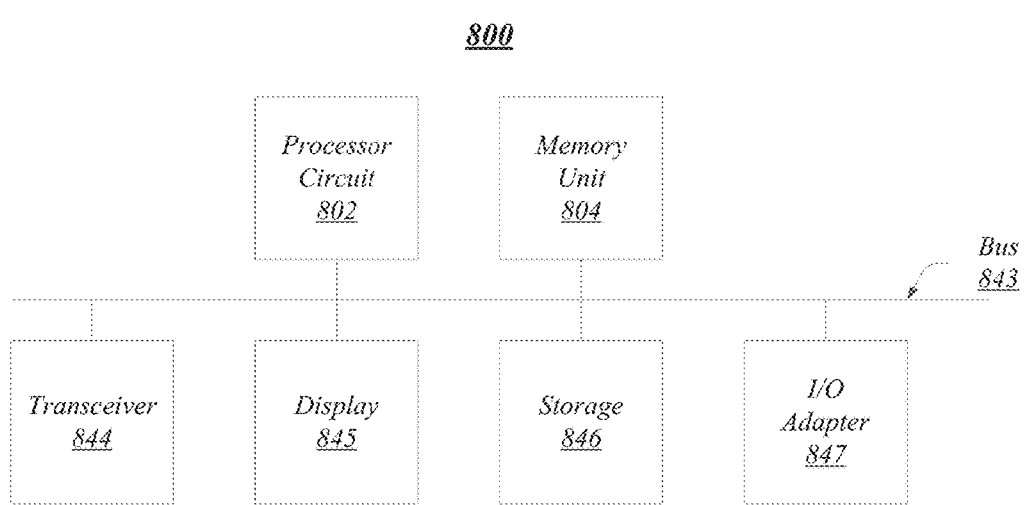
FIG. 8 illustrates one embodiment of a second system.

FIG. 8 illustrates one embodiment of a system 800. In various embodiments, system 800 may be representative of a system or architecture suitable for use with one or more embodiments described herein, such as apparatus 300 and/or system 340 of FIG. 3, logic flow 400 of FIG. 4, logic flow 500 of FIG. 5, logic flow 600 of FIG. 6, and/or storage medium 700 of FIG. 7. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In various embodiments, system 800 may include a processor circuit 802. Processor circuit 802 may be implemented using any processor or logic device, and may be the same as or similar to processor circuit 302 of FIG. 3.

In one embodiment, system 800 may include a memory unit 804 to couple to processor circuit 802. Memory unit 804 may be coupled to processor circuit 802 via communications bus 843, or by a dedicated communications bus between processor circuit 802 and memory unit 804, as desired for a given implementation. Memory unit 804 may be implemented using any machine-readable or computer-readable media capable of storing data, including both volatile and non-volatile memory, and may be the same as or similar to memory unit 304 of FIG. 3. In some embodiments, the machine-readable or computer-readable medium may include a non-transitory medium. The embodiments are not limited in this context.

In various embodiments, system 800 may include an RF transceiver 844. RF transceiver 844 may include one or more radios capable of transmitting and receiving signals using various suitable wireless communications techniques, and may be the same as or similar to RF transceiver 344 of FIG. 3.

In various embodiments, system 800 may include a display 845. Display 845 may comprise any display device capable of displaying information received from processor circuit 802, and may be the same as or similar to display 345 of FIG. 3. The embodiments are not limited in this context.

In various embodiments, system 800 may include storage 846. Storage 846 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 846 may include technology to increase the storage performance enhanced protection for valuable digital media when multiple hard drives are included, for example. Further examples of storage 846 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 800 may include one or more I/O adapters 847. Examples of I/O adapters 847 may include Universal Serial Bus (USB) ports/adapters, IEEE 1394 Firewire ports/adapters, and so forth. The embodiments are not limited in this context.

Figure 9:
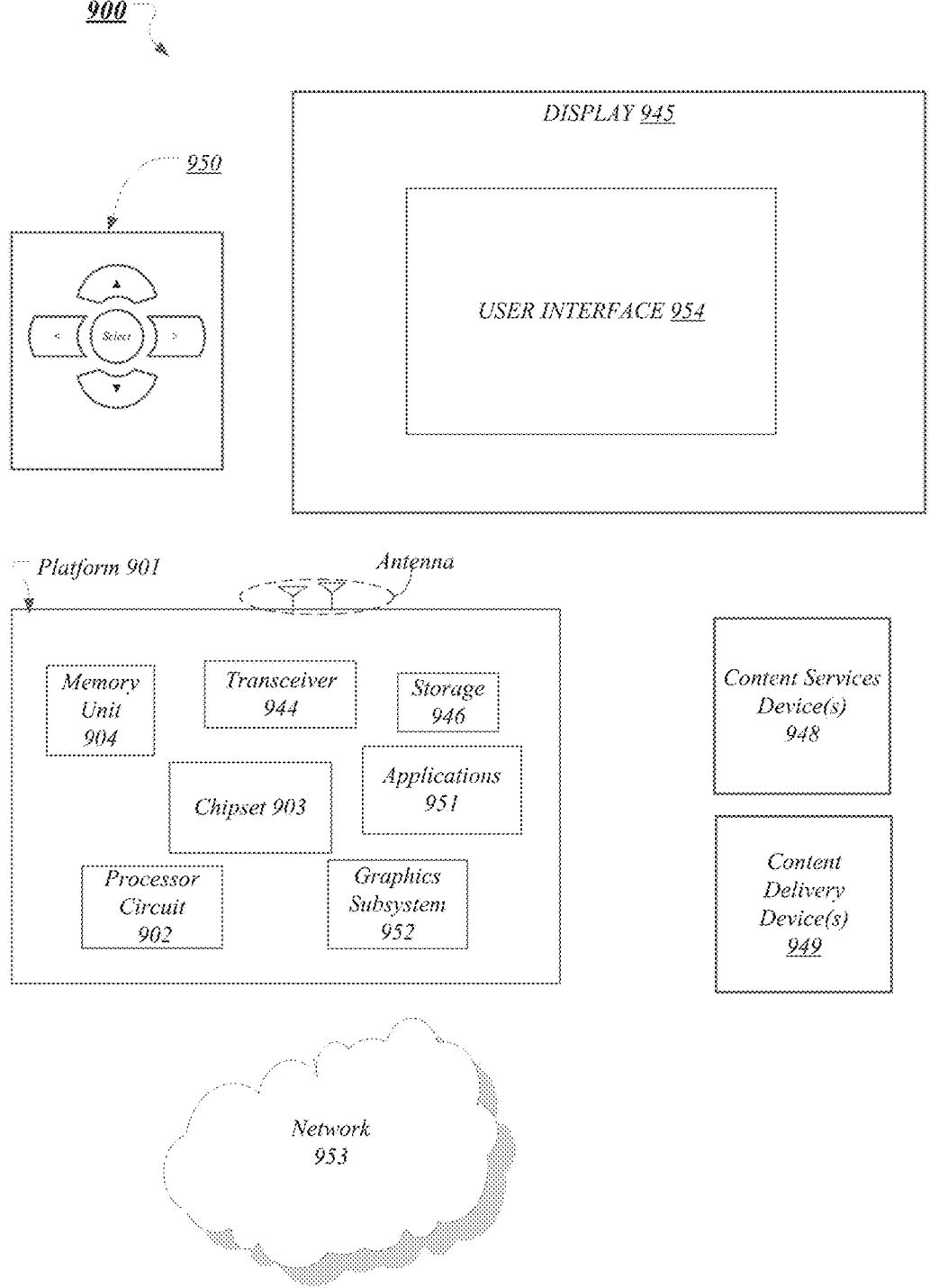
FIG. 9 illustrates one embodiment of a third system.

FIG. 9 illustrates an embodiment of a system 900. In various embodiments, system 900 may be representative of a system or architecture suitable for use with one or more embodiments described herein, such as apparatus 300 and/or system 340 of FIG. 3, logic flow 400 of FIG. 4, logic flow 500 of FIG. 5, logic flow 600 of FIG. 6, storage medium 700 of FIG. 7, and/or system 800 of FIG. 8. The embodiments are not limited in this respect.

As shown in FIG. 9, system 900 may include multiple elements. One or more elements may be implemented using one or more circuits, components, registers, processors, software subroutines, modules, or any combination thereof, as desired for a given set of design or performance constraints. Although FIG. 9 shows a limited number of elements in a certain topology by way of example, it can be appreciated that more or less elements in any suitable topology may be used in system 900 as desired for a given implementation. The embodiments are not limited in this context.

In embodiments, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 900 includes a platform 901 coupled to a display 945. Platform 901 may receive content from a content device such as content services device(s) 948 or content delivery device(s) 949 or other similar content sources. A navigation controller 950 including one or more navigation features may be used to interact with, for example, platform 901 and/or display 945. Each of these components is described in more detail below.

In embodiments, platform 901 may include any combination of a processor circuit 902, chipset 903, memory unit 904, transceiver 944, storage 946, applications 951, and/or graphics subsystem 952. Chipset 903 may provide intercommunication among processor circuit 902, memory unit 904, transceiver 944, storage 946, applications 951, and/or graphics subsystem 952. For example, chipset 903 may include a storage adapter (not depicted) capable of providing intercommunication with storage 946.

Processor circuit 902 may be implemented using any processor or logic device, and may be the same as or similar to processor circuit 802 in FIG. 8.

Memory unit 904 may be implemented using any machine-readable or computer-readable media capable of storing data, and may be the same as or similar to memory unit 804 in FIG. 8.

Transceiver 944 may include one or more radios capable of transmitting and receiving signals using various suitable wireless communications techniques, and may be the same as or similar to transceiver 844 in FIG. 8.

Display 945 may include any television type monitor or display, and may be the same as or similar to display 845 in FIG. 8.

Storage 946 may be implemented as a non-volatile storage device, and may be the same as or similar to storage 846 in FIG. 8.

Graphics subsystem 952 may perform processing of images such as still or video for display. Graphics subsystem 952 may be a graphics processing unit (GPU) or a visual processing unit (VPU), for example. An analog or digital interface may be used to communicatively couple graphics subsystem 952 and display 945. For example, the interface may be any of a High-Definition Multimedia Interface, DisplayPort, wireless HDMI, and/or wireless HD compliant techniques. Graphics subsystem 952 could be integrated into processor circuit 902 or chipset 903. Graphics subsystem 952 could be a stand-alone card communicatively coupled to chipset 903.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 948 may be hosted by any national, international and/or independent service and thus accessible to platform 901 via the Internet, for example. Content services device(s) 948 may be coupled to platform 901 and/or to display 945. Platform 901 and/or content services device(s) 948 may be coupled to a network 953 to communicate (e.g., send and/or receive) media information to and from network 953. Content delivery device(s) 949 also may be coupled to platform 901 and/or to display 945.

In embodiments, content services device(s) 948 may include a cable television box, personal computer, network, telephone, Internet enabled devices or appliance capable of delivering digital information and/or content, and any other similar device capable of unidirectionally or bidirectionally communicating content between content providers and platform 901 and/display 945, via network 953 or directly. It will be appreciated that the content may be communicated unidirectionally and/or bidirectionally to and from any one of the components in system 900 and a content provider via network 953. Examples of content may include any media information including, for example, video, music, medical and gaming information, and so forth.

Content services device(s) 948 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 901 may receive control signals from navigation controller 950 having one or more navigation features. The navigation features of navigation controller 950 may be used to interact with a user interface 954, for example. In embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be echoed on a display (e.g., display 945) by movements of a pointer, cursor, focus ring, or other visual indicators displayed on the display. For example, under the control of software applications 951, the navigation features located on navigation controller 950 may be mapped to virtual navigation features displayed on user interface 954. In embodiments, navigation controller 950 may not be a separate component but integrated into platform 901 and/or display 945. Embodiments, however, are not limited to the elements or in the context shown or described herein.

In embodiments, drivers (not shown) may include technology to enable users to instantly turn on and off platform 901 like a television with the touch of a button after initial boot-up, when enabled, for example. Program logic may allow platform 901 to stream content to media adaptors or other content services device(s) 948 or content delivery device(s) 949 when the platform is turned "off." In addition, chip set 903 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 900 may be integrated. For example, platform 901 and content services device(s) 948 may be integrated, or platform 901 and content delivery device(s) 949 may be integrated, or platform 901, content services device(s) 948, and content delivery device(s) 949 may be integrated, for example. In various embodiments, platform 901 and display 945 may be an integrated unit. Display 945 and content service device(s) 948 may be integrated, or display 945 and content delivery device(s) 949 may be integrated, for example. These examples are not meant to limit the disclosed subject matter.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 901 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
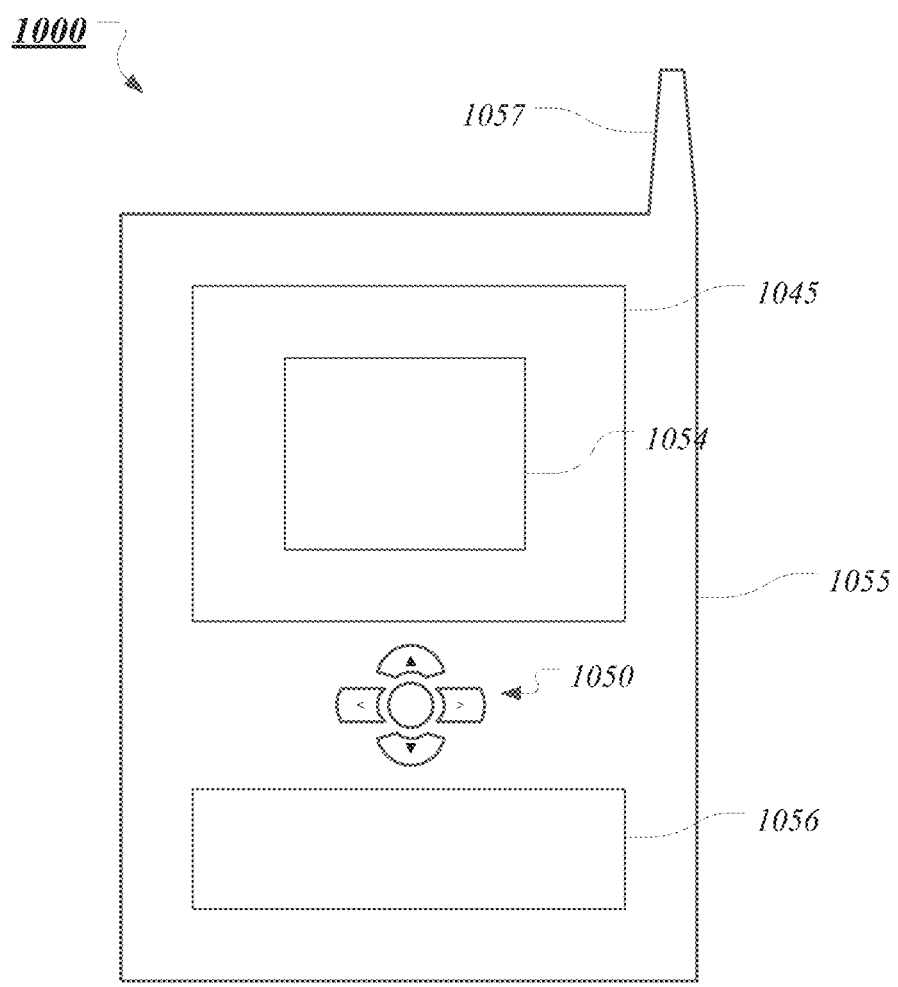
FIG. 10 illustrates one embodiment of a second device.

As described above, system 900 may be embodied in varying physical styles or form factors. FIG. 10 illustrates embodiments of a small form factor device 1000 in which system 900 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a display 1045, a navigation controller 1050, a user interface 1054, a housing 1055, an I/O device 1056, and an antenna 1057. Display 1045 may include any suitable display unit for displaying information appropriate for a mobile computing device, and may be the same as or similar to display 945 in FIG. 9. Navigation controller 1050 may include one or more navigation features which may be used to interact with user interface 1054, and may be the same as or similar to navigation controller 950 in FIG. 9. I/O device 1056 may include any suitable I/O device for entering information into a mobile computing device. Examples for I/O device 1056 may include an alphanumeric keyboard, a numeric keypad, a touch pad, input keys, buttons, switches, rocker switches, microphones, speakers, voice recognition device and software, and so forth. Information also may be entered into device 1000 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an interface management apparatus, comprising logic, at least a portion of which is in hardware, the logic to execute a basic input/output system (BIOS), determine a respective impedance state for each of one or more pins in an M.2 physical interface, determine an interface type for a peripheral device coupled with the M.2 physical interface based on the impedance states for the one or more pins, and control an operational state of the peripheral device during execution of the BIOS, based on the interface type for the peripheral device.

In Example 2, the peripheral device of Example 2 may optionally comprise a Wi-Fi adapter.

In Example 3, the logic of any of Examples 1 to 2 may optionally determine that the peripheral device comprises a Peripheral Component Interconnect Express (PCIe) device when it is determined that an electrical load is present on at least one of the one or more pins.

In Example 4, the logic of Example 3 may optionally maintain the peripheral device in an active state and initialize the peripheral device using the BIOS when it is determined that the peripheral device comprises a PCIe device.

In Example 5, the logic of any of Examples 1 to 4 may optionally determine that the peripheral device comprises a Secure Digital Input/Output (SDIO) device when it is determined that each of the one or more pins is in a high-impedance state.

In Example 6, the logic of Example 5 may optionally transition the peripheral device to a reset state, execute an operating system, and initialize the peripheral device using the operating system when it is determined that the peripheral device comprises an SDIO device.

In Example 7, the logic of Example 6 may optionally transition the peripheral device to an active state after initializing the peripheral device using the operating system.

In Example 8, the one or more pins of any of Examples 1 to 7 may optionally comprise one or more Peripheral Component Interconnect Express (PCIe) presence detect pins.

In Example 9, the M.2 physical interface of any of Examples 1 to 8 may optionally be comprised on a motherboard.

In Example 10, the M.2 physical interface of any of Examples 1 to 9 may optionally be coupled with an edge connector of the peripheral device.

In Example 11, the M.2 physical interface of any of Examples 1 to 10 may optionally be keyed to an M.2 key identifier E.

In Example 12, the interface management apparatus of any of Examples 1 to 11 may optionally comprise a Peripheral Component Interconnect Express (PCIe) bus coupled to one or more pins of the M.2 physical interface.

In Example 13, the interface management apparatus of any of Examples 1 to 12 may optionally comprise a Secure Digital Input/Output (SDIO) bus coupled to one or more pins of the M.2 physical interface.

In Example 14, the logic of any of Examples 1 to 13 may optionally execute the BIOS following a power-on of the interface management apparatus.

In Example 15, the logic of any of Examples 1 to 14 may optionally execute the BIOS following a reset of the interface management apparatus.

In Example 16, the interface management apparatus of any of Examples 1 to 15 may optionally comprise a controller hub to measure impedances on the one or more pins to determine the impedance states for the one or more pins.

In Example 17, the logic of any of Examples 1 to 16 may optionally control the operational state of the peripheral device using a state control signal.

In Example 18, the state control signal of Example 17 may optionally comprise a PERST#/SDIO_RESET# signal.

In Example 19, the logic of any of Examples 17 to 18 may optionally set the state control signal to a HIGH value to maintain the peripheral device in an active state.

In Example 20, the logic of Example 17 may optionally set the state control signal to a HIGH value to transition the peripheral device into a reset state.

Example 21 is a system, comprising an interface management apparatus according to any of Examples 1 to 20, a display, a radio frequency (RF) transceiver, and one or more RF antennas.

Example 22 is at least one non-transitory machine-readable medium comprising a set of interface management instructions that, in response to being executed on a computing device, cause the computing device to execute a basic input/output system (BIOS) of the computing device, determine a respective impedance state for each of one or more pins in an M.2 physical interface of the computing device, determine an interface type for a peripheral device coupled with the M.2 physical interface based on the impedance states for the one or more pins, and control an operational state of the peripheral device during execution of the BIOS, based on the interface type for the peripheral device.

In Example 23, the peripheral device of Example 22 may optionally comprise a Wi-Fi adapter.

In Example 24, the at least one non-transitory machine-readable medium of any of Examples 22 to 23 may optionally comprise interface management instructions that, in response to being executed on the computing device, cause the computing device to determine that the peripheral device comprises a Peripheral Component Interconnect Express (PCIe) device when it is determined that an electrical load is present on at least one of the one or more pins.

In Example 25, the at least one non-transitory machine-readable medium of Example 24 may optionally comprise interface management instructions that, in response to being executed on the computing device, cause the computing device to maintain the peripheral device in an active state and initialize the peripheral device using the BIOS when it is determined that the peripheral device comprises a PCIe device.

In Example 26, the at least one non-transitory machine-readable medium of any of Examples 22 to 25 may optionally comprise interface management instructions that, in response to being executed on the computing device, cause the computing device to determine that the peripheral device comprises a Secure Digital Input/Output (SDIO) device when it is determined that each of the one or more pins is in a high-impedance state.

In Example 27, the at least one non-transitory machine-readable medium of Example 26 may optionally comprise interface management instructions that, in response to being executed on the computing device, cause the computing device to transition the peripheral device to a reset state and initialize the peripheral device using an operating system of the computing device when it is determined that the peripheral device comprises an SDIO device.

In Example 28, the at least one non-transitory machine-readable medium of Example 27 may optionally comprise interface management instructions that, in response to being executed on the computing device, cause the computing device to transition the peripheral device to an active state after initializing the peripheral device using the operating system.

In Example 29, the one or more pins of any of Examples 22 to 28 may optionally comprise one or more Peripheral Component Interconnect Express (PCIe) presence detect pins.

In Example 30, the M.2 physical interface of any of Examples 22 to 29 may optionally be comprised on a motherboard.

In Example 31, the M.2 physical interface of any of Examples 22 to 30 may optionally be coupled with an edge connector of the peripheral device.

In Example 32, the M.2 physical interface of any of Examples 22 to 31 may optionally be keyed to an M.2 key identifier E.

In Example 33, one or more pins of the M.2 physical interface of any of Examples 22 to 32 may optionally be coupled to a Peripheral Component Interconnect Express (PCIe) bus.

In Example 34, one or more pins of the M.2 physical interface of any of Examples 22 to 33 may optionally be coupled to a Secure Digital Input/Output (SDIO) bus.

In Example 35, the at least one non-transitory machine-readable medium of any of Examples 22 to 34 may optionally comprise interface management instructions that, in response to being executed on the computing device, cause the computing device to execute the BIOS following a power-on of the computing device.

In Example 36, the at least one non-transitory machine-readable medium of any of Examples 22 to 35 may optionally comprise interface management instructions that, in response to being executed on the computing device, cause the computing device to execute the BIOS following a reset of the computing device.

In Example 37, the at least one non-transitory machine-readable medium of any of Examples 22 to 36 may optionally comprise interface management instructions that, in response to being executed on the computing device, cause the computing device to determine the impedance states for the one or more pins by measuring impedances on the one or more pins using a controller hub.

In Example 38, the at least one non-transitory machine-readable medium of any of Examples 22 to 37 may optionally comprise interface management instructions that, in response to being executed on the computing device, cause the computing device to control the operational state of the peripheral device using a state control signal.

In Example 39, the state control signal of Example 38 may optionally comprise a PERST#/SDIO_RESET# signal.

In Example 40, the at least one non-transitory machine-readable medium of any of Examples 38 to 39 may optionally comprise interface management instructions that, in response to being executed on the computing device, cause the computing device to set the state control signal to a HIGH value to maintain the peripheral device in an active state.

In Example 41, the at least one non-transitory machine-readable medium of Example 38 may optionally comprise interface management instructions that, in response to being executed on the computing device, cause the computing device to set the state control signal to a HIGH value to transition the peripheral device into a reset state.

Example 42 is an interface management method, comprising executing, by a processor circuit, a basic input/output system (BIOS) of a computing device, determining a respective impedance state for each of one or more pins in an M.2 physical interface of the computing device, determining an interface type for a peripheral device coupled with the M.2 physical interface based on the impedance states for the one or more pins, and controlling an operational state of the peripheral device during execution of the BIOS, based on the interface type for the peripheral device.

In Example 43, the peripheral device of Example 42 may optionally comprise a Wi-Fi adapter.

In Example 44, the interface management method of any of Examples 42 to 43 may optionally comprise determining that the peripheral device comprises a Peripheral Component Interconnect Express (PCIe) device when it is determined that an electrical load is present on at least one of the one or more pins.

In Example 45, the interface management method of Example 44 may optionally comprise maintaining the peripheral device in an active state and initializing the peripheral device using the BIOS when it is determined that the peripheral device comprises a PCIe device.

In Example 46, the interface management method of any of Examples 42 to 45 may optionally comprise determining that the peripheral device comprises a Secure Digital Input/Output (SDIO) device when it is determined that each of the one or more pins is in a high-impedance state.

In Example 47, the interface management method of Example 46 may optionally comprise transitioning the peripheral device to a reset state and initializing the peripheral device using an operating system of the computing device when it is determined that the peripheral device comprises an SDIO device.

In Example 48, the interface management method of Example 47 may optionally comprise transitioning the peripheral device to an active state after initializing the peripheral device using the operating system.

In Example 49, the one or more pins of any of Examples 42 to 48 may optionally comprise one or more Peripheral Component Interconnect Express (PCIe) presence detect pins.

In Example 50, the M.2 physical interface of any of Examples 42 to 49 may optionally be comprised on a motherboard.

In Example 51, the M.2 physical interface of any of Examples 42 to 50 may optionally be coupled with an edge connector of the peripheral device.

In Example 52, the M.2 physical interface of any of Examples 42 to 51 may optionally be keyed to an M.2 key identifier E.

In Example 53, one or more pins of the M.2 physical interface of any of Examples 42 to 52 may optionally be coupled to a Peripheral Component Interconnect Express (PCIe) bus.

In Example 54, one or more pins of the M.2 physical interface of any of Examples 42 to 53 may optionally be coupled to a Secure Digital Input/Output (SDIO) bus.

In Example 55, the interface management method of any of Examples 42 to 54 may optionally comprise executing the BIOS following a power-on of the computing device.

In Example 56, the interface management method of any of Examples 42 to 55 may optionally comprise executing the BIOS following a reset of the computing device.

In Example 57, the interface management method of any of Examples 42 to 56 may optionally comprise determining the impedance states for the one or more pins by measuring impedances on the one or more pins using a controller hub.

In Example 58, the interface management method of any of Examples 42 to 57 may optionally comprise controlling the operational state of the peripheral device using a state control signal.

In Example 59, the state control signal of Example 58 may optionally comprise a PERST#/SDIO_RESET# signal.

In Example 60, the interface management method of any of Examples 58 to 59 may optionally comprise setting the state control signal to a HIGH value to maintain the peripheral device in an active state.

In Example 61, the interface management method of Example 58 may optionally comprise setting the state control signal to a HIGH value to transition the peripheral device into a reset state.

Example 62 is at least one machine-readable medium comprising a set of instructions that, in response to being executed on a computing device, cause the computing device to perform an interface management method according to any of Examples 42 to 61.

Example 63 is an apparatus, comprising means for performing an interface management method according to any of Examples 42 to 61.

Example 64 is a system, comprising an apparatus according to Example 63, a display, a radio frequency (RF) transceiver, and one or more RF antennas.

Example 65 is an interface management apparatus, comprising means for executing a basic input/output system (BIOS) of a computing device, means for determining a respective impedance state for each of one or more pins in an M.2 physical interface of the computing device, means for determining an interface type for a peripheral device coupled with the M.2 physical interface based on the impedance states for the one or more pins, and means for controlling an operational state of the peripheral device during execution of the BIOS, based on the interface type for the peripheral device.

In Example 66, the peripheral device of Example 65 may optionally comprise a Wi-Fi adapter.

In Example 67, the interface management apparatus of any of Examples 65 to 66 may optionally comprise means for determining that the peripheral device comprises a Peripheral Component Interconnect Express (PCIe) device when it is determined that an electrical load is present on at least one of the one or more pins.

In Example 68, the interface management apparatus of Example 67 may optionally comprise means for maintaining the peripheral device in an active state and initializing the peripheral device using the BIOS when it is determined that the peripheral device comprises a PCIe device.

In Example 69, the interface management apparatus of any of Examples 65 to 68 may optionally comprise means for determining that the peripheral device comprises a Secure Digital Input/Output (SDIO) device when it is determined that each of the one or more pins is in a high-impedance state.

In Example 70, the interface management apparatus of Example 69 may optionally comprise means for transitioning the peripheral device to a reset state and initializing the peripheral device using an operating system of the computing device when it is determined that the peripheral device comprises an SDIO device.

In Example 71, the interface management apparatus of Example 70 may optionally comprise means for transitioning the peripheral device to an active state after initializing the peripheral device using the operating system.

In Example 72, the one or more pins of any of Examples 65 to 71 may optionally comprise one or more Peripheral Component Interconnect Express (PCIe) presence detect pins.

In Example 73, the M.2 physical interface of any of Examples 65 to 72 may optionally be comprised on a motherboard.

In Example 74, the M.2 physical interface of any of Examples 65 to 73 may optionally be coupled with an edge connector of the peripheral device.

In Example 75, the M.2 physical interface of any of Examples 65 to 74 may optionally be keyed to an M.2 key identifier E.

In Example 76, one or more pins of the M.2 physical interface of any of Examples 65 to 75 may optionally be coupled to a Peripheral Component Interconnect Express (PCIe) bus.

In Example 77, one or more pins of the M.2 physical interface of any of Examples 65 to 76 may optionally be coupled to a Secure Digital Input/Output (SDIO) bus.

In Example 78, the interface management apparatus of any of Examples 65 to 77 may optionally comprise means for executing the BIOS following a power-on of the computing device.

In Example 79, the interface management apparatus of any of Examples 65 to 78 may optionally comprise means for executing the BIOS following a reset of the computing device.

In Example 80, the interface management apparatus of any of Examples 65 to 79 may optionally comprise means for determining the impedance states for the one or more pins by measuring impedances on the one or more pins using a controller hub.

In Example 81, the interface management apparatus of any of Examples 65 to 80 may optionally comprise means for controlling the operational state of the peripheral device using a state control signal.

In Example 82, the state control signal of Example 81 may optionally comprise a PERST#/SDIO_RESET# signal.

In Example 83, the interface management apparatus of any of Examples 81 to 82 may optionally comprise means for setting the state control signal to a HIGH value to maintain the peripheral device in an active state.

In Example 84, the interface management apparatus of Example 81 may optionally comprise means for setting the state control signal to a HIGH value to transition the peripheral device into a reset state.

Example 85 is a system, comprising an interface management apparatus according to any of Examples 65 to 84, a display, a radio frequency (RF) transceiver, and one or more RF antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
memory to store instructions; and
processing circuitry coupled with the memory, the processing circuitry enabled to execute the instructions to:
    execute a basic input/output system (BIOS),
    determine a respective impedance state for each of one or more pins in an M.2 physical interface,
    determine an interface type for a peripheral device coupled with the M.2 physical interface based on the impedance states for the one or more pins,
    determine that the peripheral device comprises a Secure Digital Input/Output (SDIO) device when it is determined that each of the one or more pins is in a high-impedance state, and
    transition the peripheral device to a reset state, execute an operating system, and initialize the peripheral device using the operating system when it is determined that the peripheral device comprises an SDIO device.

2. The apparatus of claim 1, the processing circuitry to control an operational state of the peripheral device during execution of the BIOS, based on the interface type for the peripheral device.

3. The apparatus of claim 1, the peripheral device comprising a Wi-Fi adapter.

4. The apparatus of claim 1, the processing circuitry to determine that the peripheral device comprises a Peripheral Component Interconnect Express (PCIe) device when it is determined that an electrical load is present on at least one of the one or more pins.

5. The apparatus of claim 4, the processing circuitry to maintain the peripheral device in an active state and initialize the peripheral device using the BIOS when it is determined that the peripheral device comprises a PCIe device.

6. The apparatus of claim 1, the processing circuitry to transition the peripheral device to an active state after initializing the peripheral device using the operating system.

7. The apparatus of claim 1, the one or more pins comprising one or more Peripheral Component Interconnect Express (PCIe) presence detect pins.

8. The apparatus of claim 1, comprising:
a display;
a radio frequency (RF) transceiver; and
one or more RF antennas.

9. At least one non-transitory machine-readable medium comprising a set of instructions that, in response to being executed on a computing device, cause the computing device to:
execute a basic input/output system (BIOS) of the computing device;
determine a respective impedance state for each of one or more pins in an M.2 physical interface of the computing device;
determine an interface type for a peripheral device coupled with the M.2 physical interface based on the impedance states for the one or more pins;
determine that the peripheral device comprises a Secure Digital Input/Output (SDIO) device when it is determined that each of the one or more pins is in a high-impedance state; and
transition the peripheral device to a reset state and initialize the peripheral device using an operating system of the computing device when it is determined that the peripheral device comprises an SDIO device.

10. The at least one non-transitory machine-readable medium of claim 9, comprising instructions that, in response to being executed on the computing device, cause the computing device to control an operational state of the peripheral device during execution of the BIOS, based on the interface type for the peripheral device.

11. The at least one non-transitory machine-readable medium of claim 9, the peripheral device comprising a Wi-Fi adapter.

12. The at least one non-transitory machine-readable medium of claim 9, comprising instructions that, in response to being executed on the computing device, cause the computing device to determine that the peripheral device comprises a Peripheral Component Interconnect Express (PCIe) device when it is determined that an electrical load is present on at least one of the one or more pins.

13. The at least one non-transitory machine-readable medium of claim 12, comprising instructions that, in response to being executed on the computing device, cause the computing device to maintain the peripheral device in an active state and initialize the peripheral device using the BIOS when it is determined that the peripheral device comprises a PCIe device.

14. The at least one non-transitory machine-readable medium of claim 9, comprising instructions that, in response to being executed on the computing device, cause the computing device to transition the peripheral device to an active state after initializing the peripheral device using the operating system.

15. The at least one non-transitory machine-readable medium of claim 9, the one or more pins comprising one or more Peripheral Component Interconnect Express (PCIe) presence detect pins.

16. A method, comprising:
executing, by a processor circuit, a basic input/output system (BIOS) of a computing device;
determining a respective impedance state for each of one or more pins in an M.2 physical interface of the computing device;
determining an interface type for a peripheral device coupled with the M.2 physical interface based on the impedance states for the one or more pins;
determining that the peripheral device comprises a Secure Digital Input/Output (SDIO) device when it is determined that each of the one or more pins is in a high-impedance state; and
transitioning the peripheral device to a reset state and initializing the peripheral device using an operating system of the computing device when it is determined that the peripheral device comprises an SDIO device.

17. The method of claim 16, the peripheral device comprising a Wi-Fi adapter.

18. The method of claim 16, comprising determining that the peripheral device comprises a Peripheral Component Interconnect Express (PCIe) device when it is determined that an electrical load is present on at least one of the one or more pins.

19. The method of claim 18, comprising maintaining the peripheral device in an active state and initializing the peripheral device using the BIOS when it is determined that the peripheral device comprises a PCIe device.

20. The method of claim 16, comprising controlling an operational state of the peripheral device during execution of the BIOS, based on the interface type for the peripheral device.

21. The method of claim 16, comprising transitioning the peripheral device to an active state after initializing the peripheral device using the operating system.

22. The method of claim 16, the one or more pins comprising one or more Peripheral Component Interconnect Express (PCIe) presence detect pins.

* * * * *